INVENTOR:
Leo P. Retzinger, Jr.
By Marvin H. Kleinberg
Attorney

Oct. 8, 1963 L. P. RETZINGER, JR 3,106,644

LOGIC CIRCUITS EMPLOYING MINORITY CARRIER STORAGE DIODES FOR ADDING BOOSTER CHARGE TO PREVENT INPUT LOADING

Filed Feb. 27, 1958 4 Sheets-Sheet 2

INVENTOR:
Leo P. Retzinger, Jr.
By [signature]
Attorney

INVENTOR:
Leo P. Retzinger, Jr.
By [signature]
Attorney

Oct. 8, 1963 L. P. RETZINGER, JR 3,106,644

LOGIC CIRCUITS EMPLOYING MINORITY CARRIER STORAGE DIODES FOR ADDING BOOSTER CHARGE TO PREVENT INPUT LOADING

Filed Feb. 27, 1958 4 Sheets-Sheet 4

INVENTOR:
Leo P. Retzinger, Jr.

By Marvin H. Kleinberg
Attorney

United States Patent Office 3,106,644
Patented Oct. 8, 1963

3,106,644

LOGIC CIRCUITS EMPLOYING MINORITY CARRIER STORAGE DIODES FOR ADDING BOOSTER CHARGE TO PREVENT INPUT LOADING

Leo P. Retzinger, Jr., Los Angeles, Calif., assignor, by mesne assignments, to Litton Systems, Inc., Beverly Hills, Calif., a corporation of Maryland Filed Feb. 27, 1958, Ser. No. 718,086
3 Claims. (Cl. 307—88.5)

This invention relates to gating and switching circuits and more particularly, to circuits utilizing the minority carrier storage properties of semi-conductors for improving circuit response characteristics.

In circuits of the prior art, diodes in forward conduction required a finite recovery time, after a forward signal was removed, for the back impedance to reach a static value. If the diode was reverse biased, speed of recovery increased, but a reverse current was transmitted through the diode before the impedance in the back direction recovered to a high value. This reverse conduction phenomenon has been described by E. L. Steele, in vol. 25 of The Journal of Applied Physics, p. 916, as the result of the storage of an excess of minority carriers on the high resistivity side of a junction barrier. The reverse bias "sweeps out" the stored carriers, providing a reverse current.

An application of the "storage" properties of a diode resulting in an amplifying circuit has been described in the Technical News Bulletin of the National Bureau of Standards, vol. 38, No. 10, October 1954, p. 145. A voltage amplifier was devised whose gain resulted from the storage of minority carriers in a diode at a low forward voltage and the discharging of the stored carriers at a higher reverse voltage during alternate portions of a clock cycle. However, such an amplifier requires a clock power source, as well as an impedance matching device in the output, so that the power gain can be utilized.

Other authors and designers have considered the reverse current output of a back biased diode as a limitation which could be avoided by constructing diodes with faster response characteristics and negligible carrier storage. However, the present invention uses the minority carrier storage properties of a diode, not as a voltage amplifier, but to provide additional charge to driven circuits rather than power gain.

A reverse-biased diode can be compared to a current source that is first switched on and then switched off. The diode delivers an amount of charge which is related to the currents applied to the diode during forward conduction. The applied reverse bias potential and circuit impedance determine the rate of flow of the charge or, in other words, the reverse current.

In many information systems, gating and switching circuits are selected to be primarily current responsive. Current responsive circuits, however, require a finite time period to respond to changes in input signals. At any time during a transition, a discrepancy exists between the actual circuit response and a predicted response based on the steady-state dependence of circuit behavior upon the input signal. Circuit response can be markedly improved by the application of a supplementary current which tends to compensate for the discrepancy. Preferably, the supplementary current should be supplied by a source independent of the input signal source.

In most circuits, such as amplifiers, gates, switches, etc., the discrepancy may be attributed to the circuit impedance which introduces a delay that is related to the current. In some circuits, an instantaneous, infinite current would be required to eliminate a delay completely. In such circuits, additional current can merely improve the response. However, for purposes of description, there may be postulated an amount of current during the transient time which is added to the input signal to shorten the response delay. This amount of current may be expressed in terms of a charge called the "booster" charge which supplements the steady state circuit charge available in the system. In the present application, "booster charge" may be defined as the amount of charge that, if added to a circuit, produces an improvement in the transient response of that particular circuit, equivalent to that produced by increasing the steady state power supplied by a factor of two or more.

Provision of a booster charge during transition times then permits the use of lower steady state currents, and therefore smaller power drains. Furthermore, a booster charge added to a stage output permits that stage to drive a load circuit reliably through a wide range of circuit and stray impedances. Alternatively, a circuit whose output is enhanced by a booster charge, may be used to drive additional load circuits without an increase in steady state power.

In dealing with semi-conductors, consideration must be given to the response delays due to the minority carrier storage phenomenon mentioned above. In transistor circuits, especially, investigations by J. J. Ebers and J. L. Moll in vol. 42 of the Proceedings of the IRE, pp. 1761, ff. (1954) taught that the response delays in turning transistors on and off are unequal, with much more time required for turn off. The booster charge requirements for turning off transistor circuits can be expressed in terms of the minority carrier charge stored in the transistor base. The other response delays are generally symmetrical and are of a lesser significance. Inasmuch as the same physical phenomenon that creates a problem is being used for the solution, the booster charge requirements for turning off a transistor can be expressed in terms of the minority carrier storage of a diode that is necessary to provide a charge adequate to sweep the minority carriers from the base of the transistor. The booster charge output of a reverse biased "storage" diode should be equal to or greater than the booster charge requirement for discharging the carriers stored in the transistor base. Because minority carrier storage is a function of forward current, the storage characteristics are measured with respect to the steady state current normally supplied to the diodes and transistors.

In most applications, a charge of $a$ millimicrocoulombs will be needed to discharge the carriers stored in the base of a saturated transistor that has been drawing $b$ milliamperes of current. This amount of charge can be supplied in $c$ microseconds from bias sources normally drawing $d$ milliamperes of current. A storage diode, conducting $d/3$ milliamperes of forward current, can, when back biased, supply $2a/3$ millimicrocoulombs of charge to the transistor base in $c$ microseconds. It is then possible, alternatively, to reduce the bias currents to $d/3$ milliamperes or to speed up the response time to some value less than $c$ microseconds. Similarly, booster charge may be supplied to turn on a transistor but the amount of charge required is substantially less and as a practical matter the booster charge provided will rarely be less than the transistor turn off charge.

Information handling systems utilize circuitry dealing with bilevel signals, where information can be represented by pulses or voltage levels. For example, a relatively high level signal or pulse may represent a binary 0 and a relatively low level signal or pulse may represent a binary 1. In such a system, the transition between levels is made abrupt to facilitate rapid transmission of information. It is preferable in bilevel systems to operate components, and especially transistors, either at cut-off or at saturation. Such a mode of operation permits little dependence on the dynamic response characteristics of the various elements. The stability of output signals is also improved over a wider range of power supply fluctuations. However, diodes in forward conduction and transistors operating in saturation, store charge sufficient to add recovery delays to the system that are large relative to the information transmission rate of the system and therefore may be a factor limiting the frequency at which the system operates.

Circuit designs of the prior art have attempted to overcome this problem by selecting semi-conductors having extremely small storage and fast response or by adding speed-up capacitors to the circuits. Both expedients involve greater expense and circuit complexity as well as increased power drain. According to the present invention, however, no special effort is made to reduce transistor base storage, additional capacitors are not needed, but slower diodes, having appreciable minority carrier storage are used in the circuits in conjunction with the so-called "fast" diodes that are generally available. A gate circuit can be made up of "storage" diodes, each of which, for the given operating currents, stores minority carriers whose charge is equal to the booster charge requirement of a driven stage. As in prior art diode gating circuits, a bias source supplies a current to the circuit which is either shunted through the diodes in the low impedance direction, or is applied to drive the succeeding stage. The storage diodes, when reverse biased, add a booster current pulse for a limited time, which may furnish all or a substantial portion of the necessary booster charge, thereby speeding up the response of the succeeding stage.

In synchronous systems, a diode gating circuit may be constructed of several "fast" or non-storage diodes to which bilevel information signals are applied, and a slower, storage diode to which a timing or clock pulse is applied. With the proper combination of input signals, a reverse bias is applied to each of the fast diodes cutting them off. Forward conduction then starts in the storage diode to store minority carriers. A clock pulse back biases the storage diode, generating a reverse current pulse as the stored minority carriers are swept out. When all diodes are reverse biased, the bias source is applied to drive the succeeding stage. The reverse current pulse is added to the bias current as booster charge. After the storage or clock diode is discharged, the bias current continues to supply output current until one of the diodes again becomes conductive. The storage diode is selected to store enough minority carriers at operating currents to supply booster charge to the stage driven by the gate.

A transistor pulse amplifier has been designed in which storage diodes are connected in series opposition to the input terminal so that booster currents are applied to aid both turn-on and turn-off signals. Other circuits can be devised according to the principles of the present invention, such as inverter amplifier circuits and cascaded amplifiers which use the charge storage in diodes to increase or enhance the speed and reliability of circuit response.

The concept of booster charge, when applied to multivibrators or trigger circuits, takes on additional significance. Trigger circuits have feed-back and regenerative effects which after a limited amount of triggering charge is supplied, cause the circuit to continue operating without any additional input signal. If a storage diode in a preceding stage can be used to supply the triggering charge, then output current requirements of preceding stages can be greatly reduced.

A multivibrator circuit has been designed incorporating the principles of the present invention. A pair of inverter amplifiers are respectively cross-coupled the input of one to the output of the other through storage diodes. The diodes are connected to present a high impedance to turn on signals being applied to the amplifier input terminals. In a stable operating state, one amplifier is in saturated conduction and the other is held cut off. Use of storage diodes in such an arrangement provide the three-fold advantages of: steering substantially all of an incoming turn-on signal to the input terminal of an amplifier; applying a reverse current turn-off pulse to the conducting amplifier; and, isolating the input circuits of the cut-off amplifier from the output circuits of the conducting amplifier. Such a flip flop circuit can be operated at lower steady state power consumption and can be triggered by lower power input pulses. If transistor inverter amplifiers are used in the flip flop circuit, then the booster charge stored in a cross coupling diode should be greater than the charge due to minority carriers stored in the base of the transistor to be turned off. The reverse biased diode can be adequate to sweep out the carriers stored in the respective transistor base, substantially shortening the turn off time for the transistor and increasing the frequency response limits of the circuit.

Therefore, it is an object of the present invention to include a semi-conducting element having substantial minority carrier storage in switching or gating circuits to provide supplementary charge, thereby resulting in combinations that operate more rapidly than circuits of the prior art.

It is a further object of the invention to provide an improved diode gate in which synchronizing or clocking pulses applied to a reversed storage diode drive succeeding stages with the charge stored.

It is an additional object of the invention to provide a diode stage which, when the diode is back biased, supplies a charge adequate to operate a succeeding stage.

It is a still further object to provide an improved storage diode circuit for turning transistors on and off with reverse current pulses resulting from alternate condition of forward conduction and applied reverse bias.

It is a further object of invention to utilize a reverse biased storage diode as a charge source in a current circuit.

It is another object of the invention to provide an improved transistor flip flop circuit by using storage diodes in place of cross coupling resistor-capacitor circuits.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
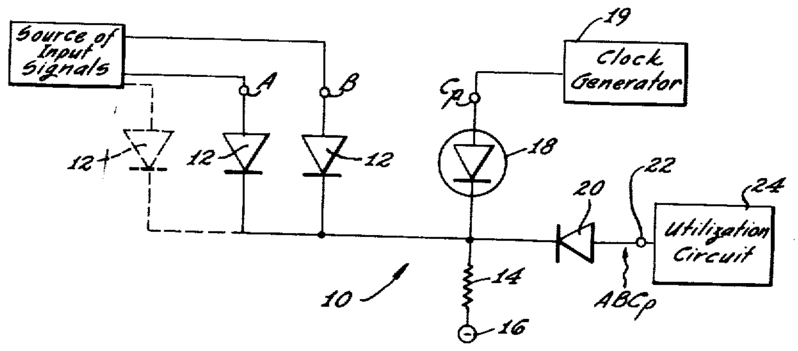
FIGURE 1 is a diagram of a clocked diode "and" gate for negative pulses.

In the drawings, the diodes which are to have appreciable minority carrier storage properties are shown enclosed in circles while diodes having relatively negligible storage are indicated by the conventional diode symbol. PNP transistors have been shown in the circuits as drawn, but the inventive concepts are not so limited and could easily be applied to NPN transistor circuits after the necessary modifications, i.e., polarity reversals have meen made.

With reference to FIG. 1, a clocked output "and" gate for negative signals has been constructed according to the principles of the present invention. Although the terms "negative" and "positive" may be used, the bilevel signals recited herein will be considered either high or low. A high, or more positive signal will represent the binary 0 and the low or more negative signal represents the binary 1. An "and" gate is a circuit that produces an output only when all of its inputs are in a prescribed state. An "or" gate provides an output when any one of its inputs is in a prescribed state. (It will be recognized that an "and" gate for signals of a low level functions as an "or" gate for signals of high level.)

In the "and" gate, shown in FIG. 1, it is seen that a plurality of signal diodes 12 are cathode coupled to a bias resistor 14. The resistor 14 is connected to a low level potential source 16. Bilevel signals, representing the binary value of logical propositions "A" and "B" are applied from respective signal sources to the anodes of the signal diodes. "And" gates having more than three inputs may be constructed by adding an extra signal diode 12 for each additional input desired.

A clock diode 18 is cathode connected to the diode-resistor junction. The clock diode 18 is selected to have an appreciable minority carrier charge storage when conducting in the forward direction. Timing or clock signals are supplied from a clock pulse generator 19, the steady state output of which is a high level signal. Low level clock pulses, *Cp*, are applied by the generator 19 to the anode of the clock diode 18 at regular intervals. In other embodiments, timing signals may be the resultant signal of a logical combination of various computer output signals which synchronize the output of the gate 10 with other elements in the system. The low level pulse output signals of the gate 10 are transmitted through an isolating diode 20 which is connected between the diode-resistor junction and an output terminal 22 in the low impedance direction for low level signals. The output terminal is then connected to a succeeding stage or utilization device 24 which may be a flip flop, pulse amplifier, or the like.

Typically, the "and" gate of FIGURE 1 is used in a bilevel system in which the high level is at a common reference potential or ground, and represents a binary 0. The low level has a −3.0 volt potential and represents a binary 1. (In one operating circuit, the low level bias source 16 is −10 volts.) The bias resistor 14 has a resistance of 7.5 kilohms. Input signal diodes 12 are germanium designated 1N67A, and the clock diode 18 is a slower, silicon diode designated 1N456. The logical proposition represented by the gate 10 is expressed "ABC*p*." A low level or binary 1 output signal is produced only on the coincident occurrence of low level or binary 1 signals at all inputs, representing the simultaneous application of signals representing logical functions A, B, and C*p*.

Figures 2, 5, 6:
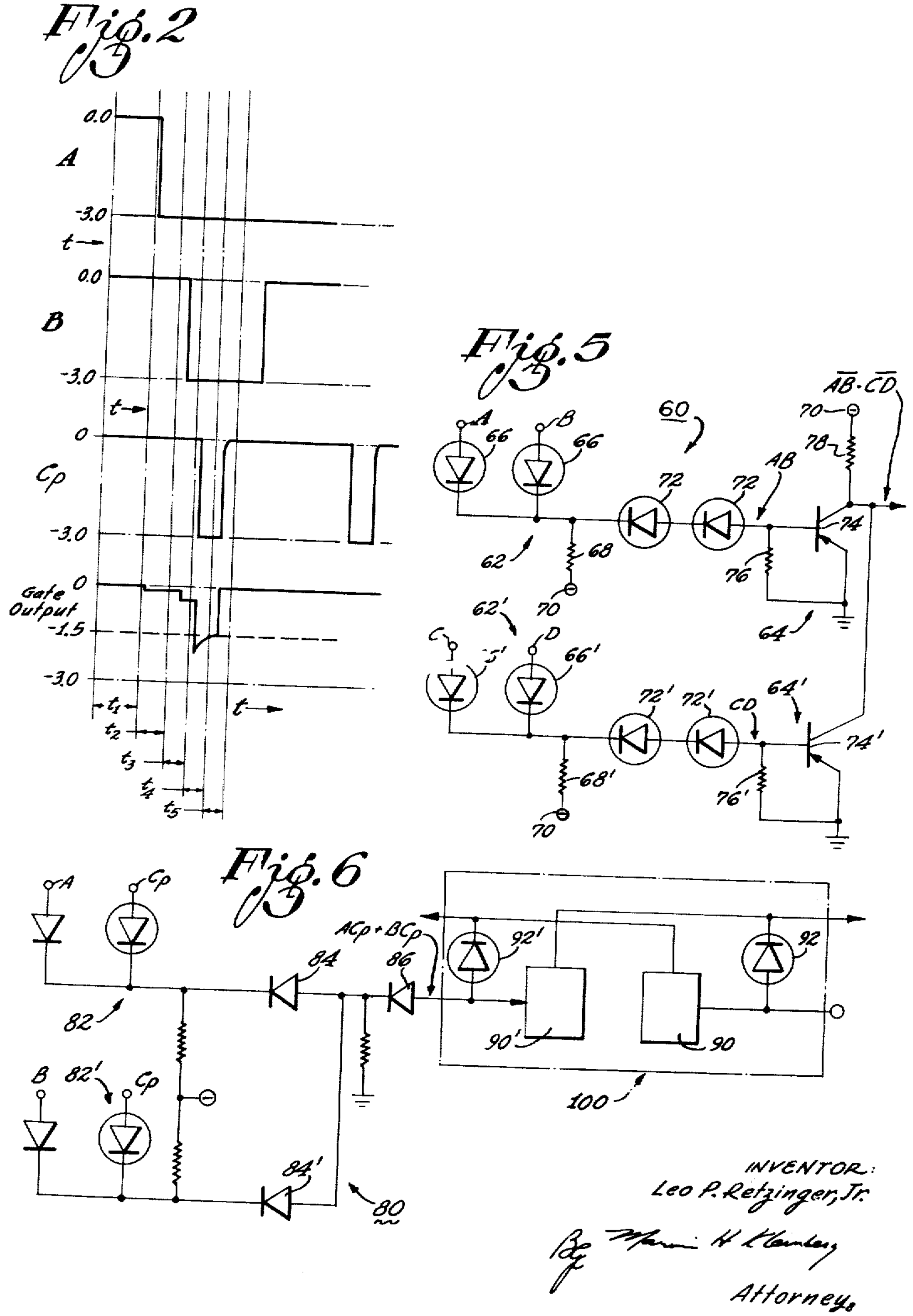
FIGURE 2 is a graph of waveforms representing behavior of elements of the circuit of FIGURE 1.
FIGURE 5 is a diagram of two asynchronous "and" gates, providing a common output.
FIGURE 6 is a diagram of a clocked diode "or" gate connected to trigger a flip flop (shown in block form)

If, for example, the inputs to the "A" and "B" diodes 12 are binary "0," the "A" and "B" diodes are forward biased into the conduction and the gate output is also a binary "0." This is shown in FIGURE 2 during the time interval marked $t_1$. The potential at the resistor-cathode junction is thus clamped to a value more negative than 0 volt by the amount of the voltage drop across the conducting diodes, which is on the order of −0.3 volt, as shown in the curve representing gate output. The clock diode 18 is not conducting although it is also forward biased, inasmuch as the particular storage diode used is chosen to have a greater conduction threshold, approximately −0.6 volt.

When "A" becomes a binary 1 (during the interval $t_2$) the A diode 12 is back biased to cut off although the B diode 12 continues to conduct. When both signal inputs become binary 1, both diodes 12 are back biased by −3.0 volts and are therefore cut off as is shown during the interval $t_3$. The potential at the junction falls until the clock diode 18 begins forward conduction, clamping the voltage to a −0.6 volt value seen during the interval $t_3$. During forward conduction in the clock diode 18, minority carriers are stored at the operating forward currents, approximately 50 to 100 millimicroseconds being required for carrier storage in the clock diode 18. Individual clock pulses of 0.2 microsecond duration are generated at a 1 megacycle rate. The rapid charging time of the clock diode 18 allows virtually the entire time interval between clock pulses, or .8 microsecond, to be used for the various signal inputs to settle to a stable condition.

It is possible that, due to signal delays and transient effects, both signal diodes 12 erroneously receive a binary 1 signal between clock pulses and the clock diode 18 is forward biased into conduction thereby storing charge. If the input signal combination reaches its correct condition with a least one signal diode conducting before application of the clock pulse, then the minority carriers stored in the clock diode 18 will be discharged through the conducting diode 12. When the inputs to both signal diodes 12 settle at binary 1 values and the clock diode 18 has been conducting, a clock pulse input signal reverse biases the clock diode 18 to a −3.0 volts value, as indicated during period $t_4$.

The stored carriers are swept out by the applied low level clock pulse, providing a low level current output at the cathode of the clock diode 18. The low level pulse in transferred in the low impedance direction through the isolating diode 20, to the succeeding circuits. When the clock diode 18 cuts off (shown in interval $t_4$), the potential at the junction again falls, this time below the level of the conduction threshold potential level for the next succeeding stage, which is on the order of −1.5 volts, so long as there is charge in the clock diode 18. When the clock diode 18 is discharged, its impedance rises and the junction potential is clamped at the conduction threshold of next stage so long as the clock diode 18 is held at the low level. When the clock pulse C*p* ceases, the level at the output returns to the highest input level as seen in interval $t_5$.

The bias source 16, provides a part of the current to the succeeding stage, in addition to and independent of, the reverse booster current pulse from the clock diode 18. However, the clock diode 18 is preferably chosen so that the stored charge is sufficient to exceed the booster charge requirements of the succeeding stage, which requirements may also include the charging of stray capacitances. Frequently, all of the triggering charge to a flip flop circuit is fully supplied by a storage diode reverse current.

Figure 3:
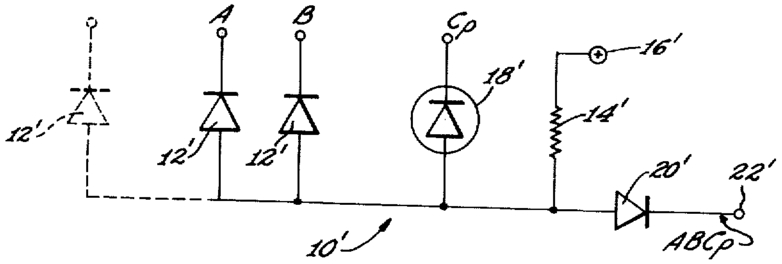
FIGURE 3 is a diagram of a clocked, diode "and" gate for positive pulses.

A similar "and" gate circuit for positive or high level signals is shown in FIG. 3. The "and" gate circuit 10′ differs from the gate of FIG. 1 in that the polarity of the bias potential with respect to ground, and, the direction of the diodes have been reversed. Signal diodes 12′ and a clock diode 18′ are here anode connected to a bias resistor 14′ which is connected to a more positive bias source 16′. An isolating diode 20′ connects the anode-resistor junction to an output terminal 22′ in the low impedance direction for high level signals.

The "and" gate 10′ operates in substantially the same fashion as the "and" gate 10 of FIGURE 1. A combination of high level inputs at the signal diode 12′ enables forward conduction in the clock diode 18′ which has applied to it a steady state low level. A clock pulse (here a high level pulse) back biases the clock diode and drives a high level booster current into the next stage.

If the gates of the present invention are incorporated into an existing computer system at the prior power consumption levels, more flip flops can be driven by each gate, the response delay in each stage is materially reduced permitting either operation at higher frequencies or the cascading of more stages to perform logical operations between clock pulses, and one gate can drive a flip flop reliably through greater circuit capacitances. Alternatively, the overall system may be efficiently operated with substantially lower power consumption.

Figure 4:
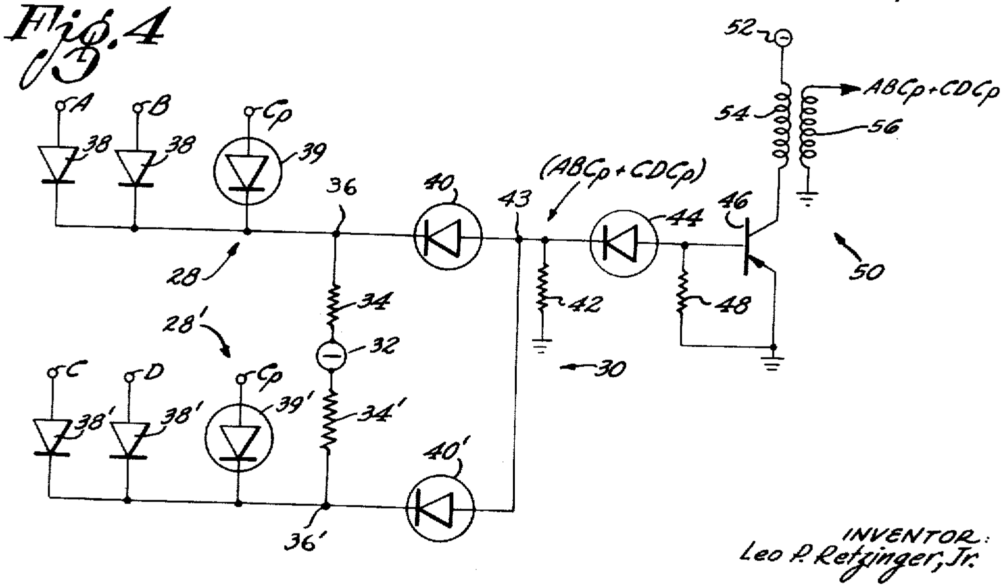
FIGURE 4 is a diagram of an improved pulse amplifier circuit including a pair of clocked diode "and" gates connected in "or" gate fashion to drive a pulse transformer.

In FIGURE 4, two, three-input "and" gates, 28, 28', similar to those described above in connection with FIGURE 1, are combined to form a synchronous "and" "or" gate 30, which in turn drives a pulse amplifier 50. A source 32 of negative bias is connected through a pair of bias resistors 34, 34' to a pair of cathode junctions 36, 36', respectively. Signal diodes 38, 38' are cathode connected to the cathode junctions 36, 36' and bilevel input signals are applied to their anodes from input signal sources, not shown. Clock diodes 39, 39', similar to those in the circuit of FIGURE 1, are also cathode connected to the junctions 36, 36' respectively, and low level clock pulses are simultaneously applied to the anodes of these clock diodes 39, 39'.

Each "and" gate 28, 28' output is connected to a respective isolating diode 40, 40'. The isolating diodes 40, 40' are storage diodes which conduct applied low level signals in the forward direction. The diodes 40, 40' are anode connected to a bias resistor 42 which is connected to ground. An output from either "and" gate 28, 28' will be transmitted through the "or" gate comprised of the diode-resistor combination.

The output of the gate 30 is connected to the cathode of a voltage discriminating storage diode 44 whose anode is connected to an inverter amplifier 46 consisting of a transistor having base, emitter, and collector terminals. The transistor base is connected to the storage diode 44 and also to ground through a base bias resistor 48. The emitter is connected to ground and the collector is connected to a negative bias source 52 through the primary winding 54 of a pulse transformer, whose secondary 56 is grounded at one end. The circuit output is taken from the ungrounded end of the secondary winding 56.

Each of the "and" gates 28, 28' operates as described above in connection with FIG. 1. The clock diodes 39, 39' each store a charge greater than the turn-on booster charge for the transistor 46 which includes any charge required for stray capacitances. The isolating diodes 40, 40' and the voltage discriminating diode 44, each store charge greater than the minority carrier charge stored in the base of the transistor 46. A low level pulse is produced at the junction 43 if either "and" gate 28, 28' or both produces a low level output when the clock pulse is applied. The logical function represented by the output of gate 30 is $ABCp+CDCp$.

The transistor 46 is turned on by a low level pulse from the gate 30, which includes the booster change from the clock diode, 39, 39' involved. At the transistor amplifier 46, the incoming turn-on pulse, enhanced by the booster charge, rapidly sends the transistor into conduction. The potential at the collector rises towards ground through the transformer primary winding 54 to induce the leading edge of a negative going pulse, relative to ground, in the secondary 56.

When the clock pulse is extinguished, conduction in the forward direction is resumed in the clock diodes 39, 39'. The other signal diodes 38, 38' of the gates 28, 28' conduct according to the signals applied to their inputs. The potential at the cathodes of the isolating diodes 40, 40' rises, toward the potential of the conducting diodes; back biasing the isolating diodes 40, 40'. A reverse booster current is produced in the isolating diodes 40, 40', raising the potential at the cathode of the voltage discriminating diode 44 which applies the reverse booster current to the transistor base, sweeping out the minority carriers stored therein. The amount of booster charge applied to the transistor cannot exceed that stored in the discriminating diode 44, as the back impedance remains low only so long as there are stored minority carriers to be discharged. As the transistor cuts off, the collector potential drops quickly to the value of the negative bias source 52, inducing a positive going pulse in the transformer secondary winding 56, which appears as the trailing edge of the pulse, the output returning thereby to the ground or high level.

The provision of booster charge from the storage diodes to accelerate the turn on and turn off response of the transistor 46, permits the pulse transformer 50 to reproduce accurately the applied clock pulse $Cp$ and transmit it to succeeding stages. By proper connection of the secondary winding 56, the pulse amplifier circuit produces either low or high level pulses. As in the present example, output of an inverter amplifier is inverted to produce a pulse of the same polarity as the original input signal.

A different "or" gate for low level signals may be used in an asychronous or unclocked system. With reference to FIG. 5 there is shown an "or" gate 60 comprised of two, two-input "and" gates 62, 62' each connected to a corresponding transistor amplifier 64 and 64' respectively, the collectors of which are connected together to provide a single output. All of the diodes in this circuit have appreciable minority carrier storage. Signal diodes 66, 66' are cathode connected to bias resistors, 68, 68' each of which is connected to a source of negative potential 70. A pair of voltage discriminating diodes 72, 72' are series connected in each rate 62, 62' to connect the resistor-cathode junctions to the respective base terminals of a pair of grounded emitter transistors 74, 74'. The transistor bases are connected to ground through respective base bias resistors 76, 76'. The transistor collectors are connected through a common collector bias resistor 78 to a negative potential source 70.

In operation, bi-level signals representing the binary 1 or 0 are applied to the anodes of individual signal diodes 66, 66'. Since, in this embodiment, all of the diodes have a substantial minority carrier storage, each of the diodes 66, 66' has a storage in excess of the booster charge needed to turn on its respective transistor 74, 74'. Each of the voltage discriminating diodes 72, 72' also have substantial minority carrier storage greater than the minority carrier storage of the transistors 74, 74' to which they ae connected.

When a binary 0 signal, represented by a high level, is applied to any input diode 66, 66', forward conduction starts in that diode, storing minority carriers therein. If, in the upper gate 62 (as viewed in FIG. 5) for example, both the A and B diodes 66 are conducting and a low level or binary 1 signal is applied to the A diode, then the minority carriers are swept out of the A diode and are discharged through the conducting B diode. The B diode continues to conduct but the A diode is reverse biased off as long as the low level signal is applied. If now a binary 1 signal is applied to the B diode while the A diode is cut off, the minority carriers in the B diode are discharged as a negative current pulse which is transmitted through the voltage discriminating diodes 72 in the forward direction to turn on the transistor 74.

The potential at the cathode junction falls and conduction starts through diodes 72 in the low impedance direction, drawing additional current from the transistor 74 to maintain conduction. The combination of the negative pulse from the B diode and the negative current from the bias source 70 holds the transistor 74 on and a positive current flows at the common collector output terminal. Charge is stored in the diodes 72 and a potential drop is created between the junction and the transistor base. When both the C and D diodes 66' are cut off, the operation is much the same, and a high level signal representing binary 0 is developed at the common collector output terminal.

If next a binary 0 or high level signal is applied to the anode of any of the signal input diodes 66, 66', for example the A diode, conduction in a forward direction is resumed. The potential at the cathode junction rises toward ground, back biasing the respective voltage discriminating diodes toward cut off. Stored carriers are discharged from the discriminating diodes to apply a booster current to the respective transistor base which, through the potential difference developed between the diodes 72, 72′, tends to drive the transistor base above ground. The stored carriers in the transistor base are discharged by the booster charge thus applied, speeding up the turn-off time.

The circuit of FIGURE 5 represents the logical proposition $\overline{AB}\cdot\overline{CD}$. If the output is applied to an inverter, the resultant output signal is represented by the equation $AB+CD$. It may be seen that the circuit of FIG. 5 is self clocking and that every time that the proper combination of input signals is applied, a circuit output will be produced. The provision of booster charge allows faster output response as well as rapid recovery of the transistors, thereby permitting operation at higher frequencies.

In FIG. 6 an "or" gate 80, similar to the gate of FIG. 4, is connected to trigger a flip flop 100, shown in block form. Because of the regenerative feedback characteristics of flip flop circuits, the triggering input pulse need only start the reversal of conductivity states.

The "or" gate portion of the circuit is made up of two, two-input "and" gates 82, 82′. The isolating and voltage discriminating diodes 40, 40′, 44 of FIG. 4 can, in this embodiment, be replaced by faster diodes 84, 84′, 86 each having negligible minority carrier storage, inasmuch as the circuit need only provide turn on booster pulses.

The flip flop 100 is made up of a pair of inverting amplifiers 90, 90′, each with its output cross coupled to the input of the other through a storage diode 92, 92′ connected to present a high impedance to incoming trigger pulses. A simple flip flop circuit of this type is described in greater detail below in connection with FIG. 7.

The clock diodes of the gate 80 each have charge storage sufficient to trigger the flip flop 100. The logical proposition $ACp+BCp$ is mechanized in the "or" gate 80, and represents the signal combination necessary to trigger the flip flop 100 into one of its stable states. A similar gating circuit may be connected to the other input terminal of the flip flop 100 to drive the flip flop 100 to its other stable state.

Figure 7:
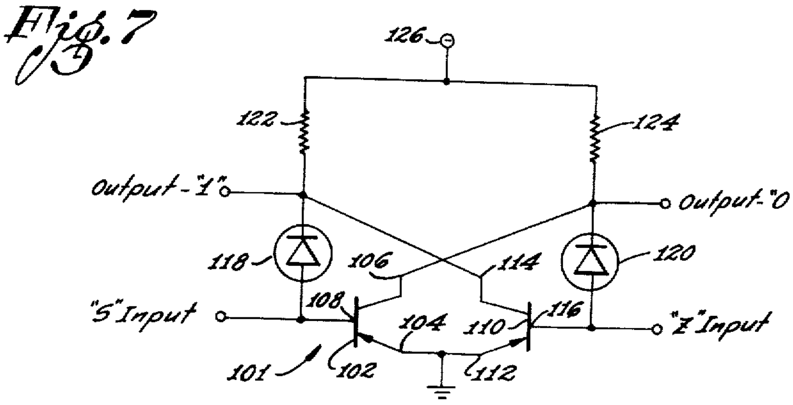
FIGURE 7 is a diagram of an improved flip flop circuit using storage diodes for cross coupling.

A flip flop 101 is shown in greater detail in FIGURE 7. Two transistors of the PNP type are used as the inverter amplifiers. A first transistor 102, having an emitter 104, collector 106, and a base 108, and a second transistor 110 also having an emitter 112, collector 114, and a base 116 are each connected in the grounded emitter configuration. A first storage diode 118 connects the first transistor base 108 to the second transistor collector 114. Similarly, the second transistor base 116 is connected to the first transistor collector 106 through a second storage diode 120. The diodes 118, 120 are connected to the respective base electrodes 108, 116 in the low impedance direction for emitter-base currents. For PNP transistors, as in the present embodiment, the diode anodes are connected to the transistor bases. Obviously, if NPN transistors were used, the polarities would be reversed and the diode cathodes would be connected to the transistor bases. The transistor collectors 106, 114 are connected through respective bias resistors 122, 124, to a source of negative potential 126. Input low level, triggering signals are applied to input terminals marked "Z" and "S" to cause operation of the flip flop in a first or "Zero" and second or "Set" stable state, respectively.

In stable operation, one of the transistors is in saturated conduction and the other is cut-off. In the embodiment shown, a negative triggering pulse applied to the "off" transistor initiates the reversal of conductivity states. If, for example, the flip flop is in the first state, then the second transistor 110 and the second diode 120 are conducting in the forward direction, and the first transistor 102 and first diode 118 are reverse biased and are non-conducting. The cross coupling diodes 118, 120 each have greater minority carrier storage than the bases of the respective transistors 102, 110. In the first stable state, minority carriers are stored in the second transistor 110 and the second diode 120.

To initiate a change of state, a low level triggering pulse is applied to the flip flop at the "S" input terminal. The first diode 118 presents a high impedance path to low level pulses so that substantially all of the triggering pulse is "steered" to the base 108 of the first transistor 102, turning it on. The pulse is amplified and inverted in the transistor to raise the potential at the first collector 106, reverse biasing the second diode 120. The stored minority carriers in the second diode 120 provide a reverse current booster pulse which sweeps the minority carriers out of the base 116 of the second transistor 110, driving it out of conduction. As the transistor 110 turns off, the potential at the second collector 114 falls toward the value of the negative source 126 until the first diode 118 is forward biased into conduction to clamp the potential at a value slightly below that at the first transistor base 108. Additional current is then drawn from the first base 108, driving the first transistor 102 into saturation. The potential at the first base 108 is held to the level of the cut off second collector 114, holding the first transistor 102 in the saturated state.

In the second or "Set" stable state, the 1 output terminal is at a more negative potential level than the 0 output terminal which is at the potential of the first collector 106. With the first transistor 104 in conduction, the first collector 106 is at a relatively high potential level and the second transistor 116 and the second diode 120 are held cut off.

To return to the first or "Zero" stable state, a low level triggering pulse is applied to the "Z" terminal. This pulse is "steered" to the base 116 of the second transistor 110, turning it on. The triggering pulse is amplified and inverted in the transistor 110 and a high level signal at the second collector 114 is applied to reverse bias the first diode 118. The first diode 118 discharges its stored booster charge into the base 108 of the first transistor 102, discharging the minority carriers stored therein. The first transistor 102 becomes non-conducting and the potential at the first collector 106 falls rapidly until the second diode 124 is biased into forward conduction, drawing current from the second transistor 110. In the first stable state, the potential at the 0 output terminal is at a level lower than the potential at the 1 output terminal. The second transistor base is held at the level of the 0 terminal through the second diode 120 and the second transistor 110 remains in saturated conduction.

As may be seen, a change of state can be triggered by application of a triggering pulse to the base of the cut off transistor. The charge stored in the cross coupling diode is sufficient to discharge the base of the conducting transistor, thereby turning it off. Once the state reversal has been initiated by the input triggering pulse, the flip flop configuration is such that the reversal of conductivity states continues without any further input signal.

Figure 8:
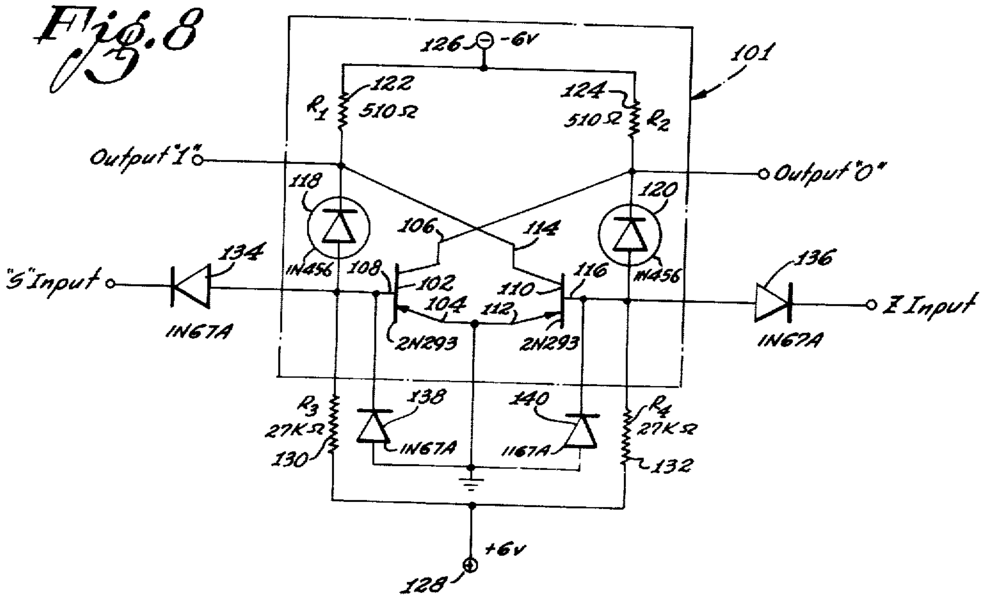
FIGURE 8 is a diagram of an alternative flip flop circuit.

In another flip flop circuit, shown in FIGURE 8, the flip flop circuit 100 of FIGURE 7 has been modified by the addition of several components to improve the circuit operation. A source of positive bias potential 128 is connected through base bias resistors 130, 132 to the first and second transistor bases 108, 116, respectively. A pair of network isolation input diodes 134, 136 are connected to the first and second transistor bases 108, 116, respectively, in the low impedance direction for low level triggering signals. Base potential excursion above ground is limited by a pair of base clamping diodes 138, 140 each connecting one of the bases 108, 116 to ground.

In an operating circuit, components set forth in the following table were used:

*Table I*

| | | |
|---|---|---|
| Bias source 126 | volts | −6.0 |
| Bias source 128 | do | +6.0 |
| Transistor 102, 110 | | PNP 2N393 |
| Diodes 118, 120 | | Silicon 1N456 |
| Diodes 134, 136, 138, 140 | | Germanium 1N67A |
| Collector bias resistors 122, 124 | ohms | 510 |
| Base bias resistors 130, 132 | do | 27,000 |

In the first stable state, the right hand transistor 110 of FIGURE 8, conducts in saturation, and the left hand transistor 102 is cut off. The potential at the second collector 114 is −0.05 volt and at the first collector 106 is −1.2 volts. The second cross coupling diode 120 is forward conducting and has an internal voltage drop of .85 volt thereby holding the base junction at a potential of −.35 volt, which is sufficient to maintain the second transistor 110 in saturation. The second base bias diode 140 is reverse biased as is the second input isolating diode 136.

The base of the first transistor 102 is connected to the positive source 128, through the base bias resistor 130. The first base bias diode 138 returns the first base 102 to ground in the low impedance direction for positive currents. The drop through the base bias diode 138 is .25 volt which holds the potential at the base 102 at +.25 volt which is sufficient to hold the first transistor 102 cut off. The cross coupling diode 118, although slightly forward biased, remains cut off since its forward conduction threshold is about .6 volt and the difference in potential across it is insufficient to initiate conduction.

To change conductivity states, a low level trigger pulse is applied to the base of the cut off, first transistor 102. The trigger pulse is transmitted through the first isolation diode 134 in the low impedance direction. Both the cross coupling diode 118 and the bias diode 138 present high impedance paths to low level pulses thereby "steering" the pulse to the base 108 of the first transistor 102. The transistor 102 starts to conduct and the potential of its collector 106 rises from −1.2 volts to −.05 volt, reverse biasing the second cross coupling diode 120. A reverse current is produced as stored carriers are swept out of the second diode 120, raising the potential at the base junction 116 toward a positive value. The minority carriers stored in the base of the transistor 110 are discharged, driving the transistor out of saturation. The potential at the junction rises through the second base bias resistor 132, and the base diode 140 conducts, clamping the second base 116 at +.25 volt, and discharging any stored charge remaining in the cross coupling diode 120. Regenerative feedback to the first transistor 102 starts as the poential of the second collector 114 drops to −1.2 volts at which point the first cross coupling diode 118 conducts in the forward direction. The potential at the first base 108, at a low level value from the trigger pulse which has not fully decayed, eventually rises to −.35 volt, which is sufficient to drive the first transistor 102 into saturation. The second stable state is then established, with the first transisor 102 in saturation and the second transistor 110 cut off. The two steady state potentials of each collector, −1.2 volts and −.05 volt, can be considered a bilevel circuit output. However, it is preferable that the outputs be amplified and clamped to system bilevel requirements, namely the 0.0 volt and −3.0 volts levels of the earlier described system.

The flip flop of FIGURE 8 operates reliably over wider temperature ranges than the simple flip flop 100 of FIGURE 7. Wider tolerances are permitted in the choice of components and higher frequency operation is possible. The duration and magnitude of the triggering signal is of less criticality and the general operation is improved. In comparison to circuits of the prior art, which included resistor-capacitor cross coupling circuits, the cross coupling diodes of the present invention not only provide a booster charge for faster transistor turn off, but, when cut off, isolate the input circuits from the output circuits, thereby reducing the steady state power drain.

Figure 9:
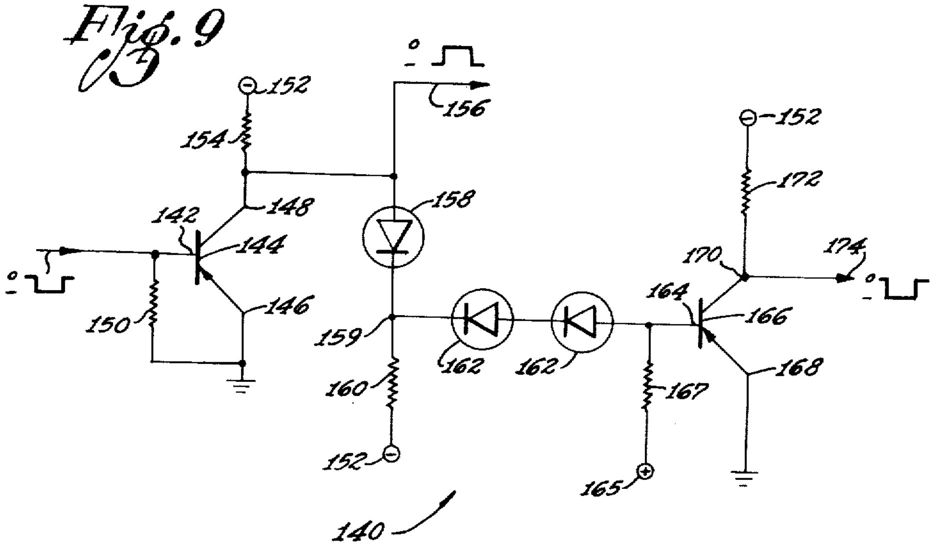
FIGURE 9 is a diagram of a two stage cascaded amplifier coupled by storage diodes according to the present invention.

The minority carrier charge yield of a reversed biased diode may also be used in the intercoupling of cascaded transistor amplifiers in a bilevel system. In FIGURE 9 there is shown a two-stage, cascaded transistor amplifier 140 which provides an output whose polarity corresponds to the polarity of the input signal.

An input signal line is connected to the base terminal 142 of a first transistor 144 having an emitter 146 and a collector 148. The emitter 146 is grounded and the base 142 is connected to ground through a base bias resistor 150. The collector 148 is connected to a negative bias source 152 through a collector bias resistor 154. The junction of the collector 148 and the resistor 154 is connected to a first stage output terminal 156 and to the anode of a first coupling storage diode 158 whose cathode is connected at a junction 159 to the negative source 152 through an output resistor 160. A pair of second coupling storage diodes 162 are series connected between the junction 159 and a base 164 of a second transistor 166 having an emitter 168 and a collector 170. The storage diodes 162 are poled in the low impedance direction for negative currents applied from the junction 159.

The charge storage of the first diode 158 is greater than the turn-on booster charge requirement of the second transistor 166. The storage of each diode of the second coupling pair 162 exceeds the storage of the base of the second transistor 166. The base 164 is connected to a source of positive bias 165 through a second base bias resistor 167. The emitter 168 is grounded and the collector 170 is connected to the negative bias source 152 through a second collector bias resistor 172. The collector 170 connects to a circuit output terminal 174, from which the circuit output is derived.

With the bilevel input signal at the first transistor base 142 at the high level value, the first transistor 144 is cut off, its collector potential is at a negative value near that of the bias source 152, and the first diode 158 is reverse biased. The first stage output terminal 156 provides a low level signal. A negative current is developed between the positive source 165 and the negative source 152 through the coupling diode pair 162 in the low impedance direction, turning on the second transistor 166. The potential at the collector 170 rises, applying a high level signal to the circuit output terminal 174. The bias resistors 167 and 160 are chosen to provide sufficient current through the coupling diode pair 162 to sustain the second transistor 166 in saturation so long as the high level signal applied to the first transistor 144 reverse biases the diode 158. Carriers are stored in the diode pair 162 and a potential difference is created between the transistor base 164 and the junction 159.

Application of the more negative level signal to the first transistor base 142 turns it on, raising the potential at the collector 148 and the output terminal 156. Current is applied to bias the first coupling diode 158 into forward conduction and minority carriers are stored. The pair of coupling diodes 162, which have been in forward conduction up to this time behave like a capacitor with a stored charge. The application of a high level to one end of the pair 162 in the reverse direction discharges the diode pair 162 and drives the base 164 towards a potential higher than the junction 159 by the amount of the drop across the pair and somewhat above ground. The stored booster charge rapidly discharges the base of the second transistor 166. The amount of booster charge supplied by the diode pair 162 is limited to the amount of charge stored in the one that first recovers high reverse impedance.

The second transistor 166 is rapidly cut off, and is kept non-conducting by the potential level at the junction 159, which is high enough to hold the base 164 cut off. The potential of the collector 170 falls to a value near that of the negative source 152, and maintains that low level at the output terminal 174.

If the signal at the first transistor base 142 again becomes more positive, the first transistor 144 cuts off. The collector 148 potential falls, reverse biasing the first diode 158 to drive a booster current pulse through the diode pair 162 in the forward direction. The second transistor 166 is turned on and is quickly driven to saturation by the combined bias sources as the first diode 158 recovers its high impedance. The output of the collector 170 rises to the higher level, in accordance with the change in the input signals.

It may be seen that virtually any circuit can be adapted to take advantage of the reverse current output of a back biased diode. In many applications for instance, a charge source is desirable, and the asymmetrical impedance of a diode is preferred to the symmetrical impedance of a corresponding resistor-capacitor combination.

Thus there has been shown a novel application of certain semiconductor properties to enhance circuit behavior, speed up response time, and reduce power requirements.

What is claimed as new is:

1. A diode gating circuit responsive to application of a timing signal and a plurality of control signals for driving an output circuit having a booster charge requirement, said gating circuit comprising: an output terminal for connection to the output circuit; means connected to said terminal for applying a predetermined current to said terminal; a plurality of diodes each having a first and second electrode and having said first electrode connected to said output terminal of said current applying means, said diodes being identically poled with respect to said output terminal and connected thereto with a poling such that they are normally forward biased by said predetermined current; a charge storage diode for storing minority carriers when in forward conduction sufficient to provide a charge exceeding the booster charge requirement of the output circuit, said storage diode having a substantially greater charge storage capability than said diodes of said plurality of diodes and having a first and second electrode, said first electrode being connected to said terminal, said storage diode having the identical poling with respect to said terminal as said plurality of diodes; means for applying the plurality of control signals to said second electrodes of said plurality of diodes for selectively reverse biasing individual ones of said plurality of diodes, said storage diode being forward biased by said predetermined current to store charge therein only when all of said plurality of diodes are reverse biased; and means for applying the timing signal to said second electrode of said storage diode for reverse biasing said storage diode to apply any booster charge stored therein to said output terminal for application to the output circuit.

2. The diode gating circuit defined by claim 1 wherein the timing signal and control signals are bilevel signals, each having either a predetermined first or second voltage level, each control signal reverse biasing the diode to which it is applied only if the control signal is at its second level, said last named means applying the timing signal at its second level to said second electrode of said storage diode simultaneously with the application of second level control signals, whereby said gating circuit applies a booster charge to said output terminal only when all of the applied control signals and the timing signal are simultaneously at the second voltage level.

3. The diode gating circuit defined by claim 1 wherein said means for applying a predetermined current comprises a resistor of relatively large impedance value for interconnecting said output terminal and a source of constant voltage to apply said predetermined current to said output terminal, said plurality of diodes being poled such that they are normally forward biased by said predetermined current to shunt said predetermined current away from said storage diode, said plurality of diodes being all back-biased in response to application of said control signals all at their second level to thereby permit said predetermined current to flow through said storage diode to store charge therein.

References Cited in the file of this patent

UNITED STATES PATENTS

| | | |
|---|---|---|
| 2,655,608 | Voldes | Oct. 13, 1953 |
| 2,782,303 | Goldberg | Feb. 19, 1957 |
| 2,831,986 | Summer | Apr. 22, 1958 |
| 2,879,409 | Holt | Mar. 24, 1959 |
| 2,908,830 | Mason et al. | Oct. 13, 1959 |

FOREIGN PATENTS

| | | |
|---|---|---|
| 166,800 | Australia | Feb. 6, 1956 |

UNITED STATES PATENT OFFICE

CERTIFICATE OF CORRECTION

Patent No. 3,106,644 October 8, 1963

Leo P. Retzinger, Jr.

It is hereby certified that error appears in the above numbered patent requiring correction and that the said Letters Patent should read as corrected below.

Column 6, line 19, for "a" read -- at --; line 25, for "volts" read -- volt --; line 30, for "pulse in" read -- pulse is --; column 7, line 51, for "change" read -- charge --; column 8, line 26, for "rate" read -- gate --; column 11, line 39, after "the" insert -- base --.

Signed and sealed this 28th day of April 1964.

(SEAL)
Attest:

ERNEST W. SWIDER
Attesting Officer

EDWARD J. BRENNER
Commissioner of Patents